(12) United States Patent
Wu et al.

(10) Patent No.: US 6,836,807 B2
(45) Date of Patent: Dec. 28, 2004

(54) WIRELESS RECEIVING DEVICE AND METHOD JOINTLY USED BY COMPUTER PERIPHERALS

(75) Inventors: Kun Chan Wu, Chung Ho (TW); Wen Sheng Liao, Chung Ho (TW); Chao Wu Chien, Chung Ho (TW); Chung Ping Chi, Chung Ho (TW)

(73) Assignee: Topseed Technology Corp., Taipei Hsien (TW)

( * ) Notice: Subject to any disclaimer, the term of this patent is extended or adjusted under 35 U.S.C. 154(b) by 362 days.

(21) Appl. No.: 09/984,473

(22) Filed: Oct. 30, 2001

(65) Prior Publication Data

US 2003/0083056 A1 May 1, 2003

(51) Int. Cl.[7] .................................................. G06F 3/00
(52) U.S. Cl. ................................ 710/8; 710/9; 455/66; 370/338; 380/270; 707/1; 446/175; 700/52
(58) Field of Search .......................... 710/8, 9; 455/66; 370/338; 380/270; 707/1; 446/175; 700/52

(56) References Cited

U.S. PATENT DOCUMENTS 5,881,366 A * 3/1999 Bodenmann et al. ....... 455/41.2

2002/0187722 A1 * 12/2002 Fong et al. .................. 446/175
2002/0188589 A1 * 12/2002 Salmenkaita et al. .......... 707/1
2003/0033032 A1 * 2/2003 Lind et al. ..................... 700/52
2003/0043771 A1 * 3/2003 Mizutani et al. ............. 370/338
2003/0048905 A1 * 3/2003 Gehring et al. .............. 380/270

FOREIGN PATENT DOCUMENTS

WO        WO 01/18662     *  3/2001   ........... G06F/13/38

* cited by examiner

*Primary Examiner*—Jeffrey Gaffin
*Assistant Examiner*—Justin Knapp
(74) *Attorney, Agent, or Firm*—Rosenberg, Klein & Lee

(57) ABSTRACT

The present invention provides a wireless receiving device jointly used by computer peripherals and a method thereof. The wireless receiving device comprises a wireless receiving circuit, a micro-processing circuit, a keystroke circuit, and an interface circuit. The micro-processing circuit can receive wireless signals emitted by wireless emitting devices of different computer peripherals via the wireless receiving circuit, and has also learning function. The keystroke circuit can be pressed to let the micro-processing circuit memorize and lock on a specific wireless emitting device. The signal processed by the micro-processing circuit is then transferred to a computer via the interface circuit.

2 Claims, 4 Drawing Sheets

WIRELESS RECEIVING DEVICE AND METHOD JOINTLY USED BY COMPUTER PERIPHERALS

FIELD OF THE INVENTION

The present invention relates to a wireless receiving device jointly used by computer peripherals and a method thereof and, more particularly, to a wireless receiving device capable of receiving signals of wireless emitting devices of different computer peripherals and having also learning function.

BACKGROUND OF THE INVENTION

A wireless device jointly used as a computer peripheral such as a wireless mouse, a wireless keyboard, a wireless joystick, and so on achieves transmission and reception of wireless signals between it and a computer via an emitting end and a receiving end to facilitate operations of a user.

Although the above conventional wireless device can save much operational space ambient a computer, once a user uses various kinds of wireless devices simultaneously, because each wireless device requires an emitting end and a receiving end, the operational space ambient the computer will be overcrowded, and the wireless devices will easily interfere one another. Moreover, only a limited number of the above wireless devices can be connected to connection ports of computer so that so many wireless devices cannot be used simultaneously.

Accordingly, the above wireless device has inconvenience and drawbacks in practical use. The present invention aims to resolve the problems in the prior art.

SUMMARY OF THE INVENTION

The primary object of the present invention is to provide a wireless receiving device jointly used by computer peripherals and a method thereof, whereby wireless signals emitted by various kinds of different wireless computer peripherals can be received.

Another object of the present invention is to provide a wireless receiving device jointly used by computer peripherals and a method thereof, which wireless receiving device has learning function to memorize and lock on a specific wireless device.

Yet another object of the present invention is to provide a wireless receiving device jointly used by computer peripherals and a method thereof, which wireless receiving device only occupies a connection port of computer.

To achieve the above objects, the present invention provides a wireless receiving device jointly used by computer peripherals and a method thereof, which wireless receiving device comprises a wireless receiving circuit, a micro-processing circuit, a keystroke circuit, and an interface circuit. The wireless receiving circuit is used to receive a wireless signal emitted by at least a wireless emitting device. The micro-processing circuit is used to identify and decode the wireless signal, and output a control signal. The interface circuit is used to receive the control signal, and output it to a computer. The keystroke circuit is used to let the micro-processing circuit enter a learning mode.

The various objects and advantages of the present invention will be more readily understood from the following detailed description when read in conjunction with the appended drawings, in which:

DETAILED DESCRIPTION OF THE PREFERRED EMBODIMENTS

Figure 1:
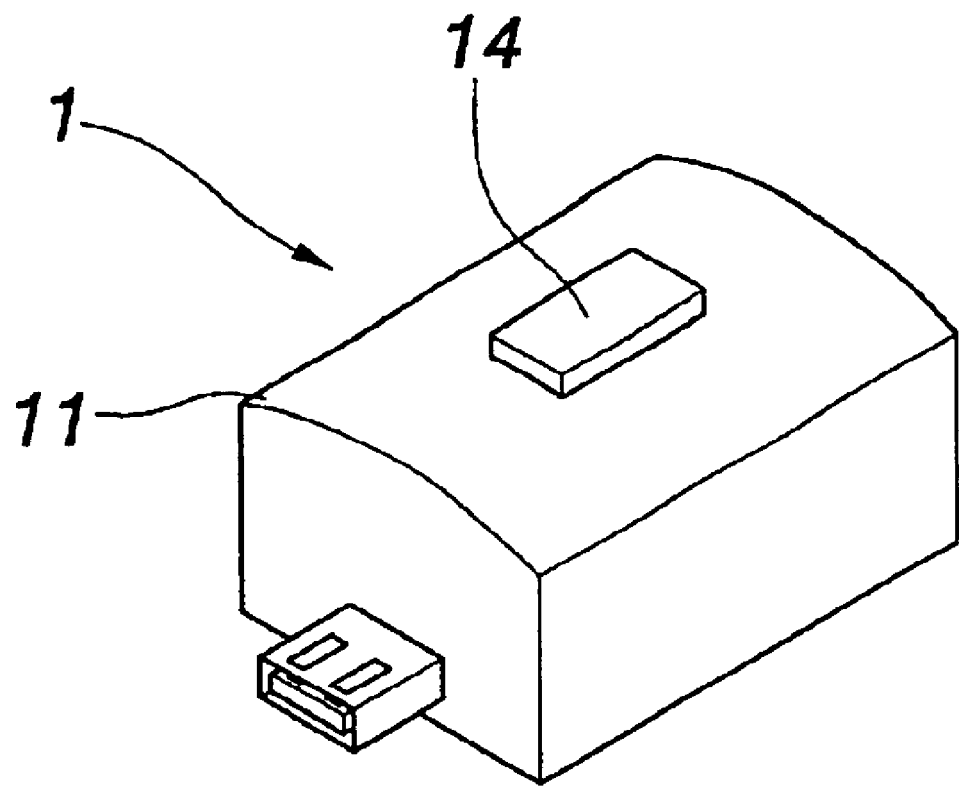
FIG. 1 is a perspective view of the present invention.
Figure 2:
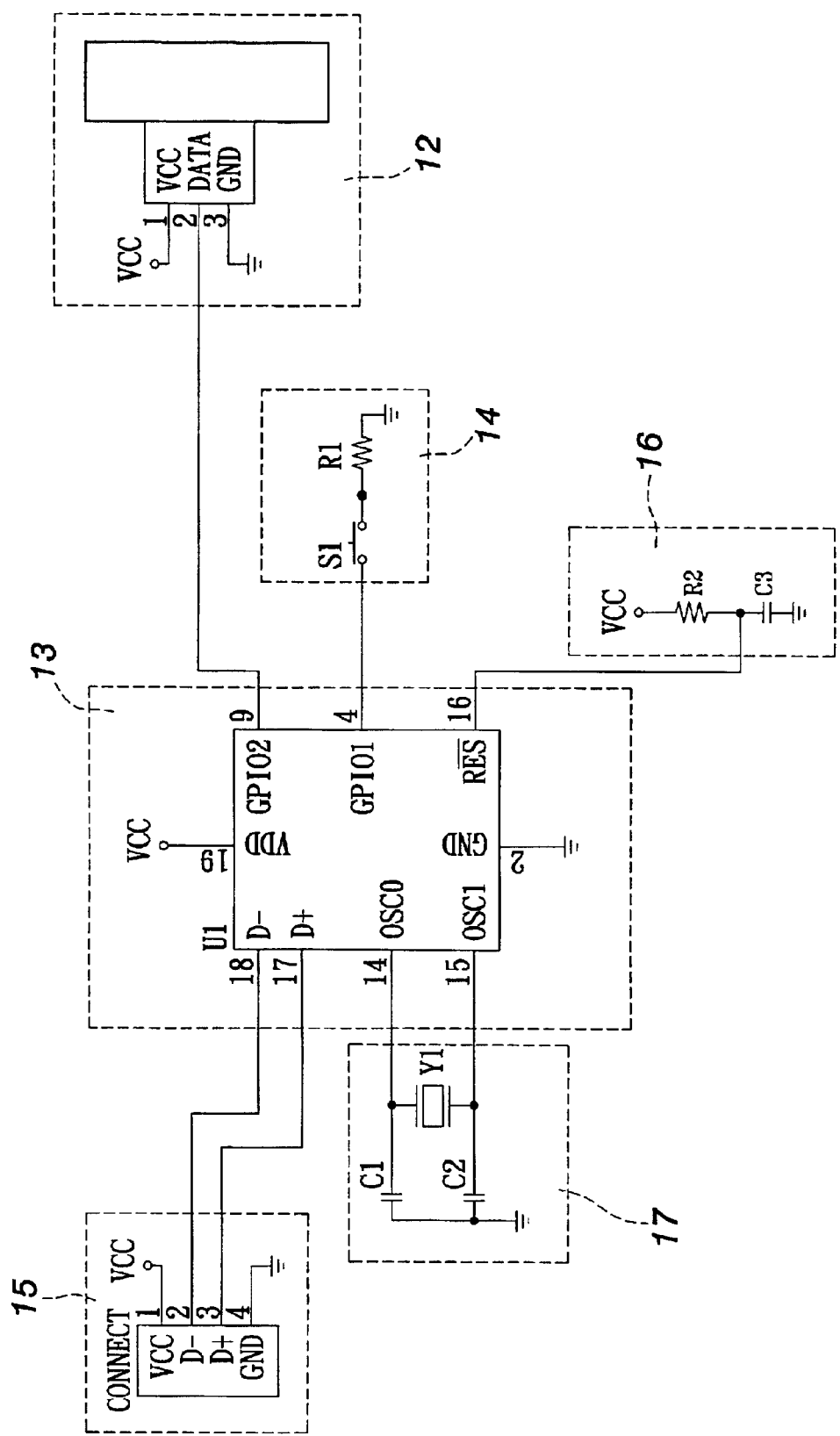
FIG. 2 is a circuit diagram of a wireless receiving device of the present invention.

As shown in FIGS. 1 and 2, the present invention provides a wireless receiving device jointly used by computer peripherals. The wireless receiving device 1 of the present invention can be used to receive wireless signals emitted by wireless emitting devices of different computer peripherals, and has learning function. The wireless receiving device 1 comprises a shell body 11, a wireless receiving circuit 12, a micro-processing circuit 13, a keystroke circuit 14, an interface circuit 15, a reset circuit 16, and an oscillation circuit 17.

Figure 4:
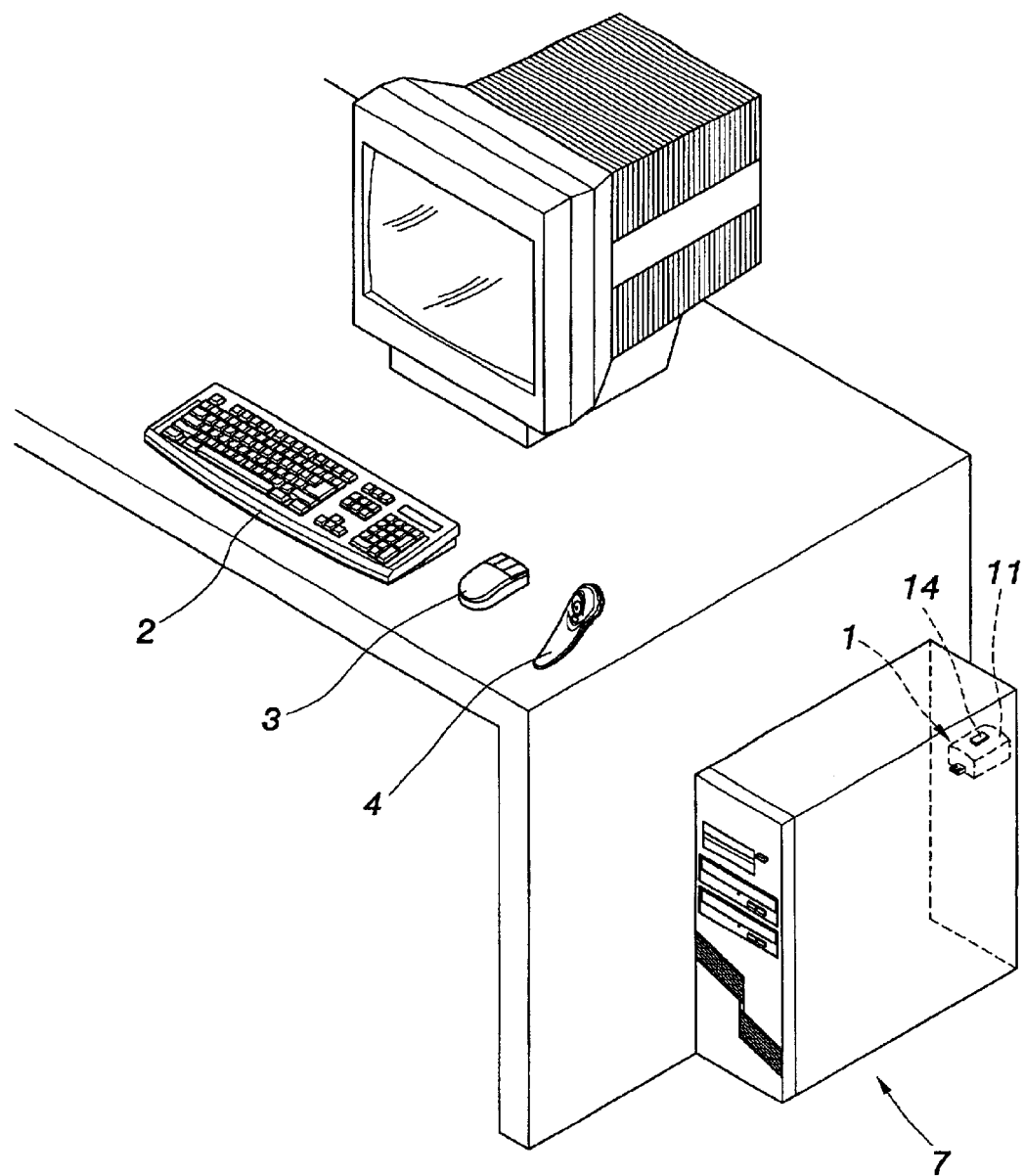
FIG. 4 is a diagram showing that the present invention is used to receive wireless signals of computer peripherals.

The wireless receiving circuit 12, the micro-processing circuit 13, the keystroke circuit 14, the interface circuit 15, the reset circuit 16, and the oscillation circuit 17 are disposed in the shell body 11. The shell body 11 can be inserted in a computer 7, as shown in FIG. 4.

The wireless receiving circuit 12 is used to receive wireless signals emitted by wireless emitting devices. The wireless receiving circuit 12 adopts the frequency shift keying (FSK) modulation technique to enhance anti-noise capability. The wireless emitting device can be a wireless keyboard 2, a wireless mouse 3, a wireless remote controller 4 (shown in FIG. 4), or another wireless emitting device.

The present invention will be illustrated with the wireless keyboard 2, the wireless mouse 3, and the wireless remote controller 4 as examples of wireless emitting devices. Each wireless emitting device has an ID code representing its identity, and the ID code is composed of a product code and an identity code. In other words, different kinds of wireless emitting devices are distinguished according to different product codes, and different wireless emitting devices of the same kind are distinguished according to different identity codes.

The micro-processing circuit 13 is used to identify and decode the received wireless signal to distinguish the kind of the wireless emitting device and the transmitted message, and convert them into a control signal. The wireless signal is composed of the ID code and data. The data is used to represent action message emitted by the wireless emitting device.

The interface circuit 15 is connected to the output end of the micro-processing circuit 13, and is used to receive the control signal. The interface circuit 15 can be connected to a transmission port conforming to the universal serial bus (USB) protocol of a computer.

The keystroke circuit 14 is composed of a resistor R1 and a key S1, and is connected to the input end of the micro-processing circuit 13. The keystroke circuit 14 can let the micro-processing circuit 13 perform learning function. The learning function can memorize and lock on a device under the situation that there are several wireless emitting devices of the same kind. For instance, if there are mice A, B, and C, and the wireless receiving device 1 only receives message emitted by the mouse A currently, in order to switch to the state of only receiving message of the mouse B, it is only necessary to press the key S1 to let the micro-processing circuit 13 enter a learning mode. At this time, the mouse B functions, while the mice A and C do not function. After the wireless receiving circuit 12 receives a wireless signal emitted by the mouse B, the micro-processing circuit 13 will memorize the representative ID code and lock on it. That is, the wireless receiving device 1 only receives message emitted by the mouse B afterwards. Therefore, using this learning function, different users can have their individual mice. It is only necessary to press the keystroke circuit 14 to let the mouse in the hand function.

The reset circuit 16 is composed of a resistor R2 and a capacitor C3, and is connected to the input end of the micro-processing circuit 13. The reset circuit 16 is used to initiate the micro-processing circuit 13.

The oscillation circuit 17 is composed of capacitors C1 and C2 and a quartz crystal Y1, and is connected to the input end of the micro-processing circuit 13. The oscillation circuit 17 is used to provide the working frequency.

Figure 3:
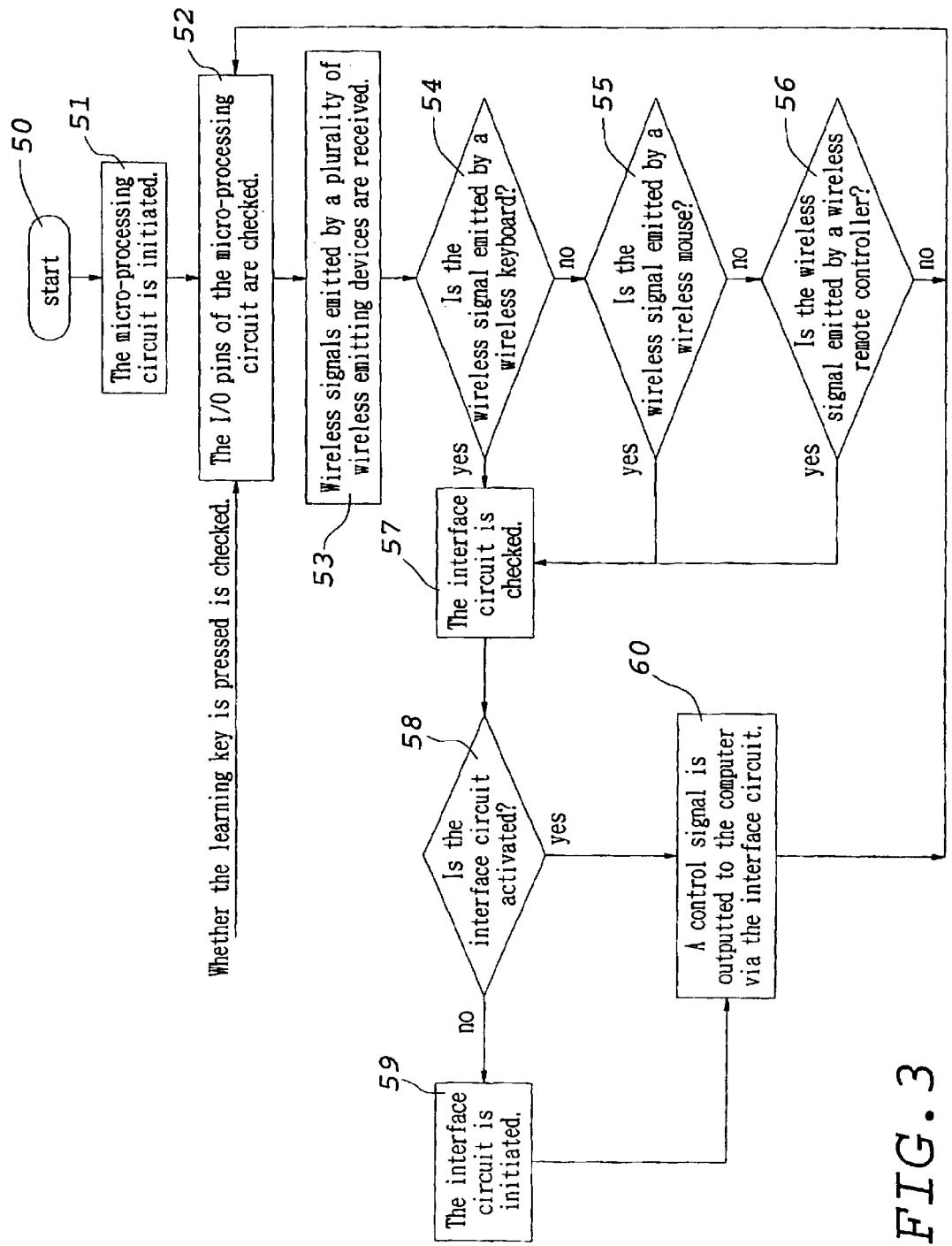
FIG. 3 is an operational flowchart of a wireless receiving method of the present invention.

As shown in FIG. 3, a wireless receiving method jointly used by computer peripherals of the present invention comprises the following steps.

Step 50: start;

Step 51: The micro-processing circuit 13 is initiated;

Step 52: The I/O pins of the micro-processing circuit 13 are checked;

Step 53: Wireless signals emitted by a plurality of wireless emitting devices are received;

Step 54: The micro-processing circuit 13 judges whether the wireless signal is emitted by a wireless keyboard 2. If the answer is positive, data in the wireless signal is decoded into a control signal, and Step 57 is jumped to; otherwise, Step 55 is jumped to;

Step 55: The micro-processing circuit 13 judges whether the wireless signal is emitted by a wireless mouse 3. If the answer is positive, data in the wireless signal is decoded into a control signal, and Step 57 is jumped to; otherwise, Step 56 is jumped to;

Step 56: The micro-processing circuit 13 judges whether the wireless signal is emitted by a wireless remote controller 4. If the answer is positive, data in the wireless signal is decoded into a control signal, and Step 57 is jumped to; otherwise, Step 52 is jumped back to;

Step 57: The interface circuit 15 is checked;

Step 58: Whether the interface circuit 15 is activated is judged. If the answer is positive, Step 60 is jumped to; otherwise, Step 59 is jumped to;

Step 59: The interface circuit 15 is initiated;

Step 60: The control signal is outputted to the computer 7 via the interface circuit 15, and Step 52 is jumped back to.

Additionally, at the Step 52, when the keystroke circuit 14 is pressed, the micro-processing circuit 13 can enter the learning mode so that the can receive the wireless signal emitted by the wireless emitting device at the Step 53 and memorize the ID code representing the wireless emitting device. The wireless emitting device can be the wireless keyboard 2, the wireless mouse 3, or the wireless remote controller 4. The interface circuit 15 in the Steps 57 to 60 is the USB.

As shown in FIG. 4, when the present invention is to be directly used, it is only necessary to insert the wireless receiving device 1 in a connection port of the computer 7. The wireless receiving device 1 can receive wireless signals emitted by the wireless keyboard 2, the wireless mouse 3, the wireless remote controller 4, or other wireless peripherals, and the operation is convenient. Therefore, the problems encountered in the conventional wireless device can be effectively resolved.

To sum up, the present invention provides a wireless receiving device jointly used by computer peripherals and a method thereof. The present invention has the following characteristics.

1. Wireless signals emitted by wireless emitting devices of different kinds of computer peripherals can be received.
2. The wireless receiving device has learning function to memorize and lock on a specific wireless emitting device.
3. Only a connection port of computer is occupied.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

We claim:

1. A wireless receiving device jointly used by a plurality of wireless computer peripherals, comprising:

a shell body;

a wireless receiving circuit disposed in said shell body and used to receive a wireless signal emitted by any of at least a portion of said plurality of wireless computer peripherals;

a micro-processing circuit disposed in said shell body and coupled to said wireless receiving circuit for identifying a source of said wireless signal and decoding said wireless signal if said wireless signal is from a recognized source, said micro-processing circuit outputting a control signal corresponding to said decoded wireless signal;

an interface circuit coupled to said micro-processing circuit for transferring said control signal to a computer, a portion of said interface circuit extending from said shell body for coupling with a signal transmission port of the computer and supporting said shell body thereat; and a keystroke circuit disposed in said shell body and coupled to said micro-processing circuit for generating a learning mode command signal input to said micro-processing circuit, said keystroke circuit including a switch exposed external to said shell body for initiating said learning mode command signal, said micro-processing circuit responding to said learning mode command signal to replace one recognized source with another of said wireless computer peripherals.

2. A wireless receiving method of a receiving device jointly used by a plurality of wireless computer peripherals, comprising the steps of:

(a) initiating a micro-processing circuit;

(b) checking I/O pins of said micro-processing circuit for input of a learning mode command signal from a learning key switch;

(c) receiving a wireless signal currently emitted by one of the plurality of wireless computer peripherals;

(d) determining whether said received wireless signal is from a recognized source, said received wireless signal being decoded into a control signal if said received wireless signal is from a recognized source, an identification of the currently emitting wireless computer peripheral replacing an identification of a previously recognized source responsive to said input of said learning mode command signal being detected in step (b); and (e) transferring said control signal from an interface circuit to a computer.

* * * * *